United States Patent
Leighton (10) Patent No.: US 12,449,659 B2
(45) Date of Patent: Oct. 21, 2025

(54) OPTICAL DEVICE

(71) Applicant: Snap Inc., Santa Monica, CA (US)

(72) Inventor: James Leighton, Burghfield Common (GB)

(73) Assignee: SNAP INC., Santa Monica, CA (US)

( * ) Notice: Subject to any disclaimer, the term of this patent is extended or adjusted under 35 U.S.C. 154(b) by 197 days.

(21) Appl. No.: 17/995,660

(22) PCT Filed: Apr. 7, 2021

(86) PCT No.: PCT/EP2021/059093
§ 371 (c)(1),
(2) Date: Oct. 6, 2022

(87) PCT Pub. No.: WO2021/204894
PCT Pub. Date: Oct. 14, 2021

(65) Prior Publication Data
US 2023/0161163 A1 May 25, 2023

(30) Foreign Application Priority Data

Apr. 7, 2020 (EP) ..................................... 20168515

(51) Int. Cl.
*G02B 27/01* (2006.01)
*F21V 8/00* (2006.01)
(Continued)

(52) U.S. Cl.
CPC ....... *G02B 27/0172* (2013.01); *G02B 6/0035* (2013.01); *G02B 6/4214* (2013.01); *G02B 27/4272* (2013.01); *G02B 2027/0123* (2013.01)

(58) Field of Classification Search
CPC ................ G02B 6/0035; G02B 6/0016; G02B 27/0172; G02B 27/4272; G02B 2027/0123; G02B 6/4214
See application file for complete search history.

(56) References Cited

U.S. PATENT DOCUMENTS 8,760,762 B1   6/2014 Kelly et al.
8,830,588 B1 * 9/2014 Brown ............... G02B 27/0172
                                                        359/633
(Continued)

FOREIGN PATENT DOCUMENTS

CN       112752991       5/2021
CN       116964509       10/2023
(Continued)

OTHER PUBLICATIONS

"International Application Serial No. PCT/EP2021/059093, International Search Report mailed Jun. 23, 2021", 3 pgs.
(Continued)

Primary Examiner — Michael P Mooney
(74) Attorney, Agent, or Firm — SCHWEGMAN LUNDBERG & WOESSNER, P.A.

(57) ABSTRACT

Optical devices and methods for expanding input light and outputting the expanded light include a waveguide and an input optical element to receive light incident on a first side of the waveguide. The input optical element includes an input reflective surface to reflect the received light into the waveguide. An intermediate diffractive optical element receives light in the waveguide from a first direction, and provides an expansion of the received light in a second direction perpendicular to the first direction. An output optical element includes an output reflective surface to reflect the expanded light out of the waveguide towards a viewer. The waveguide guides light along an optical path from the input optical element to the intermediate diffractive optical element and from the intermediate diffractive optical element to the output optical element.

20 Claims, 8 Drawing Sheets (51) Int. Cl.
    *G02B 6/42*     (2006.01)
    *G02B 27/42*     (2006.01)

(56) References Cited

U.S. PATENT DOCUMENTS

| | | | | |
|---|---|---|---|---|
| 2003/0165017 A1* | 9/2003 | Amitai | ............... | G02B 27/0172 |
| | | | | 359/636 |
| 2012/0002256 A1 | 1/2012 | Lacoste et al. | | |
| 2018/0088325 A1* | 3/2018 | Brown | ............... | G02B 27/30 |

FOREIGN PATENT DOCUMENTS

| | | | |
|---|---|---|---|
| EP | 4133326 | A1 | 2/2023 |
| GB | 2577327 | A | 3/2020 |
| KR | 100839574 | B1 | 6/2008 |
| WO | WO-2016020643 | A1 | 2/2016 |
| WO | WO-2020065251 | A1 | 4/2020 |
| WO | WO-2021204894 | A1 | 10/2021 |

OTHER PUBLICATIONS

"International Application Serial No. PCT/EP2021/059093, Written Opinion mailed Jun. 23, 2021", 6 pgs.

"European Application Serial No. 21717423.4, Office Action mailed Nov. 18, 2022", 3 pgs.

"European Application Serial No. 21717423.4, Response to Communication pursuant to Rules 161(1) and 162 EPC filed May 15, 2023", 37 pgs.

"International Application Serial No. PCT/EP2021/059093, International Preliminary Report on Patentability mailed Oct. 20, 2022", 8 pgs.

"Chinese Application Serial No. 202180026749.1, Office Action mailed Nov. 6, 2024", w/ English translation, 18 pgs.

"European Application Serial No. 21717423.4, Communication Pursuant to Article 94(3) EPC mailed Feb. 5, 2025", 6 pgs.

"Chinese Application Serial No. 202180026749.1, Office Action mailed Mar. 18, 2025", w/ English Translation, 17 pgs.

"Chinese Application Serial No. 202180026749.1, Response filed Feb. 24, 2025 to Office Action mailed Nov. 6, 2024", w/ English machine translation, 7 pgs.

"Chinese Application Serial No. 202180026749.1, Response filed May 9, 2025 to Office Action mailed Mar. 18, 2025", w/ English Claims, 9 pgs.

"European Application Serial No. 21717423.4, Response filed Jun. 3, 2025 to Communication Pursuant to Article 94(3) EPC mailed Feb. 5, 2025", 36 pgs.

"Korean Application Serial No. 10-2022-7038705, Notice of Preliminary Rejection mailed Apr. 30, 2025", W/English Translation, 11 pgs.

"Korean Application Serial No. 10-2022-7038705, Resposne filed Jun. 25, 2025 to Notice of Preliminary Rejection mailed Apr. 30, 2025", w/ English Claims, 34 pgs.

"Chinese Application Serial No. 202180026749.1, Response filed Aug. 6, 2025 to Office Action mailed Jun. 12, 2025", w/ English Claims, 8 pgs.

"Chinese Application Serial No. 202180026749.1, Response filed Sep. 2, 2025 to Consultation by Telephone of Aug. 25, 2025", w/ English Claims, 8 pgs.

"Chinese Application Serial No. 202180026749.1, Office Action mailed Jun. 12, 2025", w/ English Translation, 8 pgs.

\* cited by examiner

FIG. 1

*Prior Art*

OPTICAL DEVICE

CLAIM OF PRIORITY

This application is a U.S. national-phase application filed under 35 U.S.C. § 371 from International Application Serial No. PCT/EP2021/059093, filed on Apr. 7, 2021, and published as WO 2021/204894 on Oct. 14, 2021, which claims the benefit of priority to EP Application Serial No. 20168515.3, filed on Apr. 7, 2020, each of which are incorporated herein by reference in their entireties.

TECHNICAL FIELD

The invention relates to waveguides for near-eye displays such as augmented reality or virtual reality displays. In such displays, a light source provides an image which is expanded in a waveguide and coupled out of the waveguide towards a viewer.

BACKGROUND

An augmented reality display allows a user to view their surroundings as well as projected images. In military or transportation applications the projected images can be overlaid on the real world perceived by the user. Other applications for these displays include video games and wearable devices, such as glasses. Any augmented reality display can be used as a virtual reality display, simply by covering the view of the real world.

Figure 1:
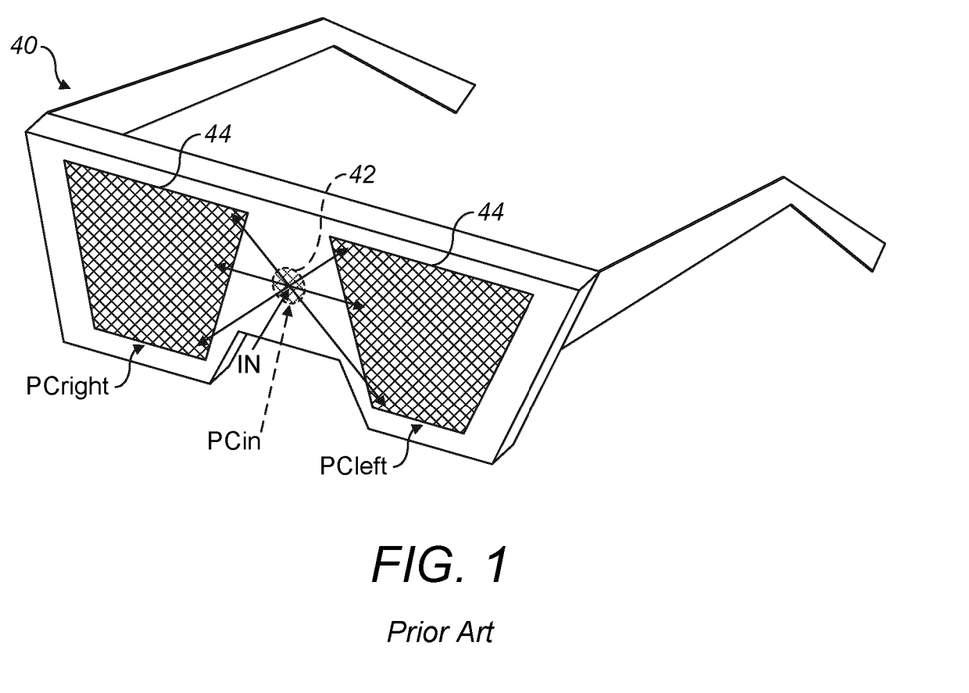
FIG. 1 is a schematic illustration of an augmented reality system.

An example of a normal augmented reality set-up is illustrated in FIG. 1, in the form of wearable glasses 40.

In the normal augmented reality set-up, a transparent display screen 44 is provided in front of a user so that they can continue to see the physical world. The transparent display screen 44 may comprise one screen for each of the user's eyes. The display screen is typically a glass waveguide, and a projector is provided to one side. Light from the projector is coupled into the waveguide by a diffraction grating (an input grating 42). The projected light is totally internally reflected within the waveguide. The light is then coupled out of the waveguide by another diffraction grating (output grating) so that it can be viewed by a user. The projector can provide information and/or images that augment a user's view of the physical world.

A challenge exists in the production of wide-screen augmented reality or virtual reality displays because light from an input projector needs to be provided across the entire width of the display (if augmented reality is desired across the full width). One solution is to provide a single input projector and optics that can expand the field of view across the width of the display.

However, in a normal setup using an output grating, it is difficult to attain both high efficiency and high uniformity, due to the continuous nature of the pupil replication that is provided by the output grating.

Accordingly, it is desirable to provide a more efficient and/or uniform waveguide optical device for an augmented reality or virtual reality display.

SUMMARY

According to a first aspect, the present disclosure provides an optical device for expanding input light and outputting the expanded light, the optical device comprising: a waveguide; an input optical element configured to receive light incident on a first side of the waveguide and comprising an input reflective surface configured to reflect the received light into the waveguide; an intermediate diffractive optical element configured to receive light in the waveguide from a first direction, and provide an expansion of the received light in a second direction perpendicular to the first direction; and an output optical element comprising an output reflective surface configured to reflect the expanded light out of the waveguide towards a viewer.

The waveguide is configured to guide light along an optical path from the input optical element to the intermediate diffractive element and from the intermediate diffractive optical element to the output optical element. The optical path may be direct between the optical elements, or may comprise one or more additional elements or redirections of the light.

By providing an optical device with reflective input and output elements, and an intermediate diffractive optical element configured to expand light perpendicular to the direction of propagation in the waveguide, the optical device is able to expand light without suffering the efficiency and uniformity losses associated with an output grating.

Optionally, the output optical element is spaced apart from the input optical element in the first direction. The intermediate diffractive optical element receives light from the input optical element and couples expanded light towards the output optical element. This provides a simple linear arrangement that may be simply constructed.

Optionally, the output optical element is configured to reflect light out of the waveguide through the first side. In more specific examples, optionally, the input reflective surface is geometrically similar to the output reflective surface. Alternatively, the output optical element may be configured to reflect light out of the waveguide through a second side opposite the first side.

In other words, the optical device may be configured either to output light on a same side as light was received into the device, or to output light on an opposing side from light received into the device. This means that the optical device can be adapted to a variety of different use cases while achieving the advantages of the invention.

Optionally, the input optical element is configured to reflect light into the waveguide with a range of angles relative to a plane of the waveguide. This has the effect that the received light is expanded parallel to its direction of motion within the waveguide and, in combination with expansion in the intermediate diffractive optical element, provides two-dimensional expansion. Similarly, the waveguide may be configured to receive input light with an angular field of view, and to expand the received light in its direction of motion by a first expansion factor, by total internal reflection.

By additionally configuring the waveguide to expand light in the first direction by total internal reflection, the device is capable of expanding light independently in two perpendicular directions, still without suffering the efficiency losses associated with an output grating.

Optionally, the intermediate diffractive optical element is configured to expand the received light in the second direction by second expansion factor that is a predetermined multiple of the first expansion factor.

By defining a predetermined ratio between the expansion factors in the two perpendicular directions, an aspect ratio of the expanded light may be controlled without modifying a light source.

Optionally, the intermediate diffractive optical element comprises a first grating oriented at a third angle to light received from the input optical element to provide a first diffraction and a second diffraction within the intermediate diffractive optical element in order to couple light towards the output optical element, wherein the first diffraction couples light from the input optical element towards the first grating at a fourth angle so that the second diffraction is provided at a plurality of spaced positions in the intermediate diffractive optical structure thereby providing expansion of light, wherein the second diffraction couples light towards the output diffractive optical structure.

A grating provides a simple way of implementing the function of the intermediate diffractive optical element. A grating may, for example, be etched or deposited on a surface of the waveguide.

Optionally, the intermediate diffractive optical element further comprises second grating oriented at a fifth angle to light received from the input optical element to provide a third diffraction and a fourth diffraction within the intermediate diffractive optical element in order to couple light towards the output optical element, wherein the third diffraction couples light from the input optical element towards the second diffractive features at a fourth angle so that the fourth diffraction is provided at a plurality of spaced positions in the intermediate diffractive optical structure thereby providing one-dimensional expansion of light, wherein the fourth diffraction couples light towards the output diffractive optical structure.

By using two gratings, the optical device can be configured to produce output light which is symmetrically bright around a centre of the output light in the second direction.

Optionally, the first angle and the third angle are substantially equal and opposite. By using equal and opposite angles, the two gratings can provide symmetrical expansion in the second direction with a simple construction.

Optionally, the first angle is $+(45+\Delta)°$ and the third angle is $-(45+\Delta)°$, where $\Delta$ is non-zero. The parameter A may be controlled to modify an expansion factor of light expansion in the second direction.

Optionally, the first and second gratings are physically spaced apart on the waveguide. By spacing the gratings apart, the first and second gratings can be provided as basic gratings on a single surface of the waveguide, simplifying construction.

Optionally, the first and second gratings are at least partially overlaid on one another in the waveguide as a pair of crossed gratings. By overlaying the gratings, a size of the intermediate diffractive optical element can be reduced, and the size of the overall optical device can be reduced.

Optionally, the first and second gratings are provided on opposing surfaces of the waveguide. By providing the gratings on opposing surfaces, the size of the optical device can be reduced while still being able to produce the intermediate diffractive optical element by simple techniques.

Optionally, the first and second gratings are provided in substantially the same plane in the waveguide. By providing the gratings in substantially the same plane, it can be ensured that light interacts with both gratings simultaneously, such that expansion in the second direction is necessarily symmetric.

Optionally, the first and second gratings are provided using a photonic crystal. By using a photonic crystal, the gratings are embedded in the waveguide, and are protected from external damage.

According to a second aspect, the present disclosure provides an optical system comprising: an optical device according to the first aspect, and a projector arranged to project light towards the input optical element of the optical device.

Such an optical system has improved efficiency compared to an optical system wherein light is coupled out of a waveguide using an output grating.

Optionally, the projector is configured to project light across an angular field of view of the input optical element.

By projecting across an angular field of view, the optical device can expand light in the first direction even when the input reflective surface is a flat surface, simplifying construction of the optical device.

DETAILED DESCRIPTION

Figure 2A:
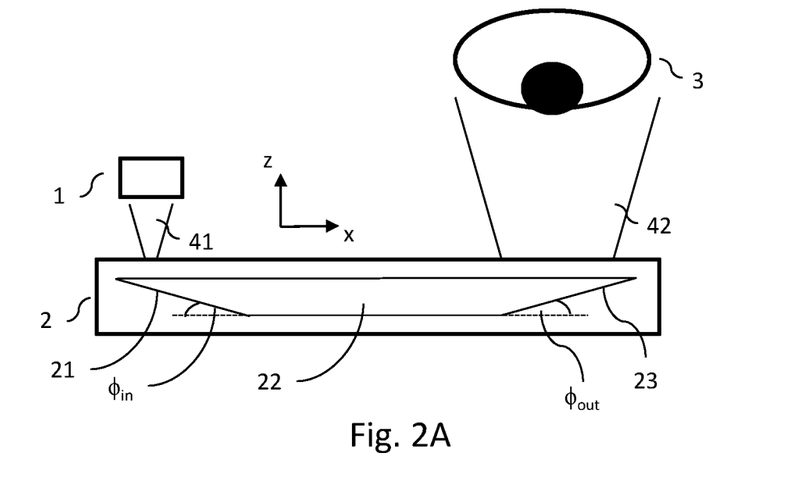
FIGS. 2A and 2B are schematic illustrations of optical systems according to the invention.
Figure 2B:
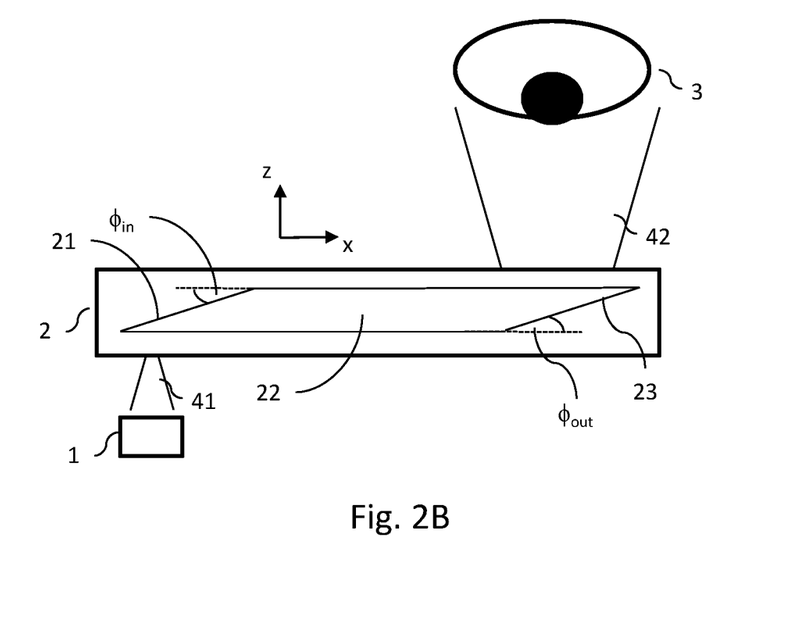

FIGS. 2A and 2B are schematic illustrations of optical systems according to the invention, which may for example be used for augmented reality or virtual reality displays, with x- and z-directions labelled for comparison to subsequent figures. The optical systems of FIGS. 2A and 2B may, for example, be used in glasses similar to the glasses 40 of FIG. 1.

In the optical system, light 41 is projected from a projector 1 onto an optical device 2. The optical device 2 expands the received light 41 and outputs expanded light 42 towards a user's eye 3.

The projector 1 may face a same side of the optical device 2 as the eye 3, as shown in FIG. 2A, or the projector 1 may face an opposite side of the optical device 2 from the eye 3, as shown in FIG. 2B.

The optical device 2 is a planar structure with a waveguide 22 oriented along the x axis. An input optical element 21 is configured to couple light into the waveguide 22, and an output optical element 23 is configured to couple light out of the waveguide 22.

The input optical element 21 and the output optical element 23 each comprise a respective reflective, preferably non-dispersive, surface. Light incident on the optical device 2 at the input optical element reflects on the input reflective surface and into the waveguide 22. Light from the waveguide 22 reflects on the output reflective surface, and out of the optical device 2.

In this embodiment, the reflective surfaces are flat surfaces with a surface normal in the x-z plane, and are arranged at respective angles $\varphi_{in}$ and $\varphi_{out}$ relative to the x-axis.

In the example of FIG. 2A, it is preferable that the direction of light passing through the optical device is reflected in the z-axis between the input and output. In order to achieve this, the angles $\varphi_{in}$ and $\varphi_{out}$ as labelled in FIG. 2A are equal, such that the reflective surfaces have mirror image orientations.

In the example of FIG. 2B, it is preferable that the direction of light passing through the optical device is preserved. In order to achieve this, the angles $\varphi_{in}$ and $\varphi_{out}$ as labelled in FIG. 2B are equal, such that the reflective surfaces have parallel orientations (i.e. the output reflective surface is rotated by 180 degrees in the x-z plane relative to the input reflective surface).

Figure 3:
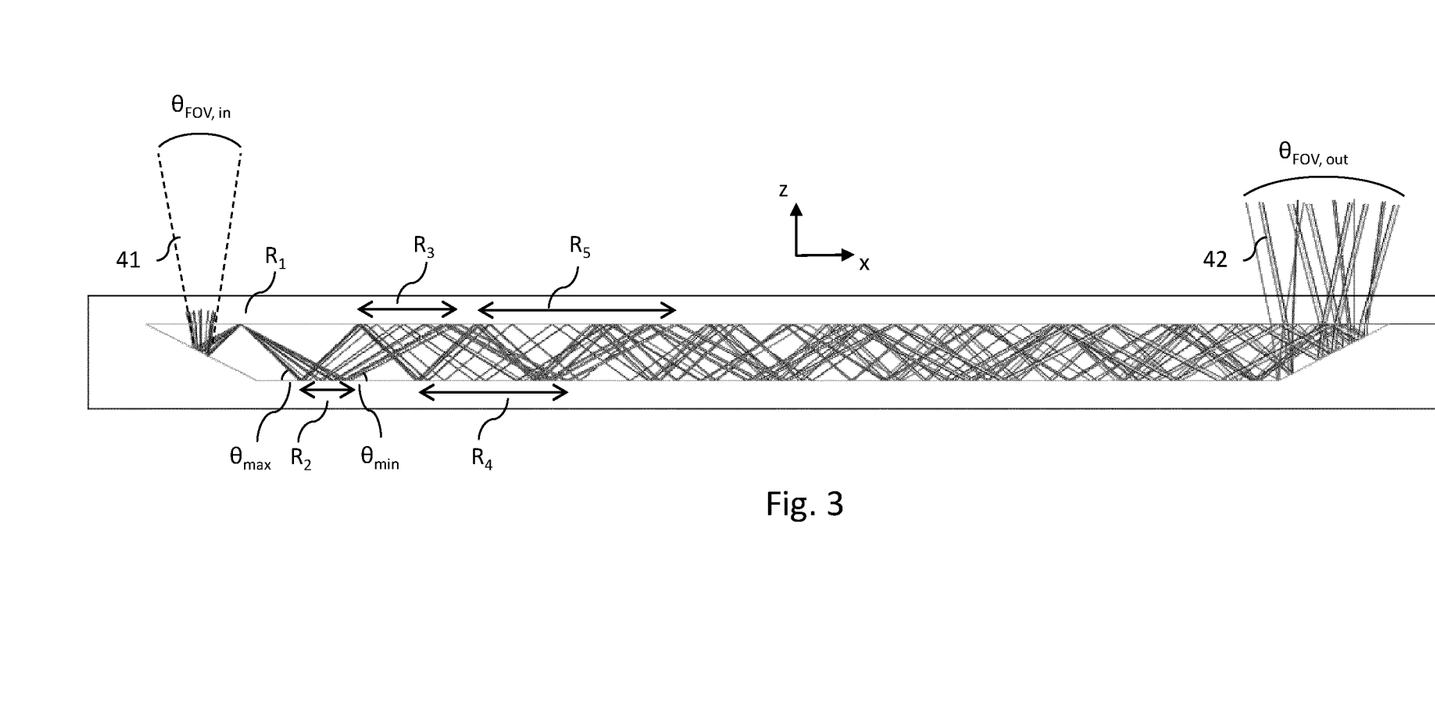
FIG. 3 is a schematic side view of an optical device according to the invention.

FIG. 3 is a schematic cross section of the optical device 2 with the configuration of FIG. 2A, in a side view containing the x- and z-axes, and illustrates light rays passing through the optical device 2.

Light incident on the optical device 2 at the input optical element 21 is spread over an angular range, also called a field of view FOV, $\theta_{FOV,in}$. For example, a projector 1 used with the optical device 2 could be a wide flat source or a curved source extending across the field of view. In a flat light source, an electronic time delay could be used to simulate a curved source, or a frame rate and/or shutter speed could be kept slow enough that no time correction is needed.

As a result of the field of view, the light reflected into the waveguide has a range of angles relative to a plane of the waveguide. As the light propagates within the optical device, experiencing total internal reflection within the waveguide 22, the angular range in the waveguide is fixed between a maximum angle $\theta_{max}$ relative to the x-axis and a minimum angle $\theta_{min}$ relative to the x-axis. However, due to this angular divergence, a linear spread of the light increases as the light propagates in the waveguide 22. This can be seen with the increasing length of the reflection zones R1 to R5 which indicate where each illustrated light ray experiences its nth reflection in the waveguide 22. Accordingly, when the light reaches the output optical element 23, the light has undergone linear expansion in the x-direction. Nevertheless, because $\varphi_{in}$ and $\varphi_{out}$ are equal, the angular range $\theta_{FOV,out}$ of light output from the optical device 2 is the same as $\theta_{FOV,in}$.

An expansion factor, in the x-direction, of the light 42 relative to the input light 41, is dependent upon the path length of the light in the waveguide 22. Accordingly, the x-direction expansion factor can be increased by lengthening the waveguide 22, and decreased by shortening the waveguide 22. Additionally, the expansion factor can be increased by decreasing $\varphi_{in}$ and $\varphi_{out}$ relative to the x-axis such that light propagates at a greater angle to the x-direction and the path length increases, and vice versa.

As can be seen in FIG. 3, a smaller area of the input reflective surface is used for reflecting input light than the area of the output reflective surface used for reflecting output light. Therefore, while the illustrated input and output optical elements in FIG. 3 have the same size, the input optical element 21 can in general be smaller than the output optical element 23. More specifically, the ratio of lengths of the reflective surfaces in the illustrated x-z plane may be the same as the expansion factor of the optical device 2 in the x-z plane.

Additionally, the optical device 2 expands light in a y-direction that is perpendicular to the x-direction between the input optical element 21 and the output optical element 23. The expansion in the y-direction is independent from the expansion in the x-direction. More specifically, while the expansion in the x-direction is reflective expansion, the expansion in the y-direction is diffractive expansion. The optical device 2 may be configured such that a first expansion factor for reflective expansion, which depends upon the length of the waveguide, is a predetermined multiple of a second expansion factor for diffractive expansion, which is controlled as described below.

Figure 4:
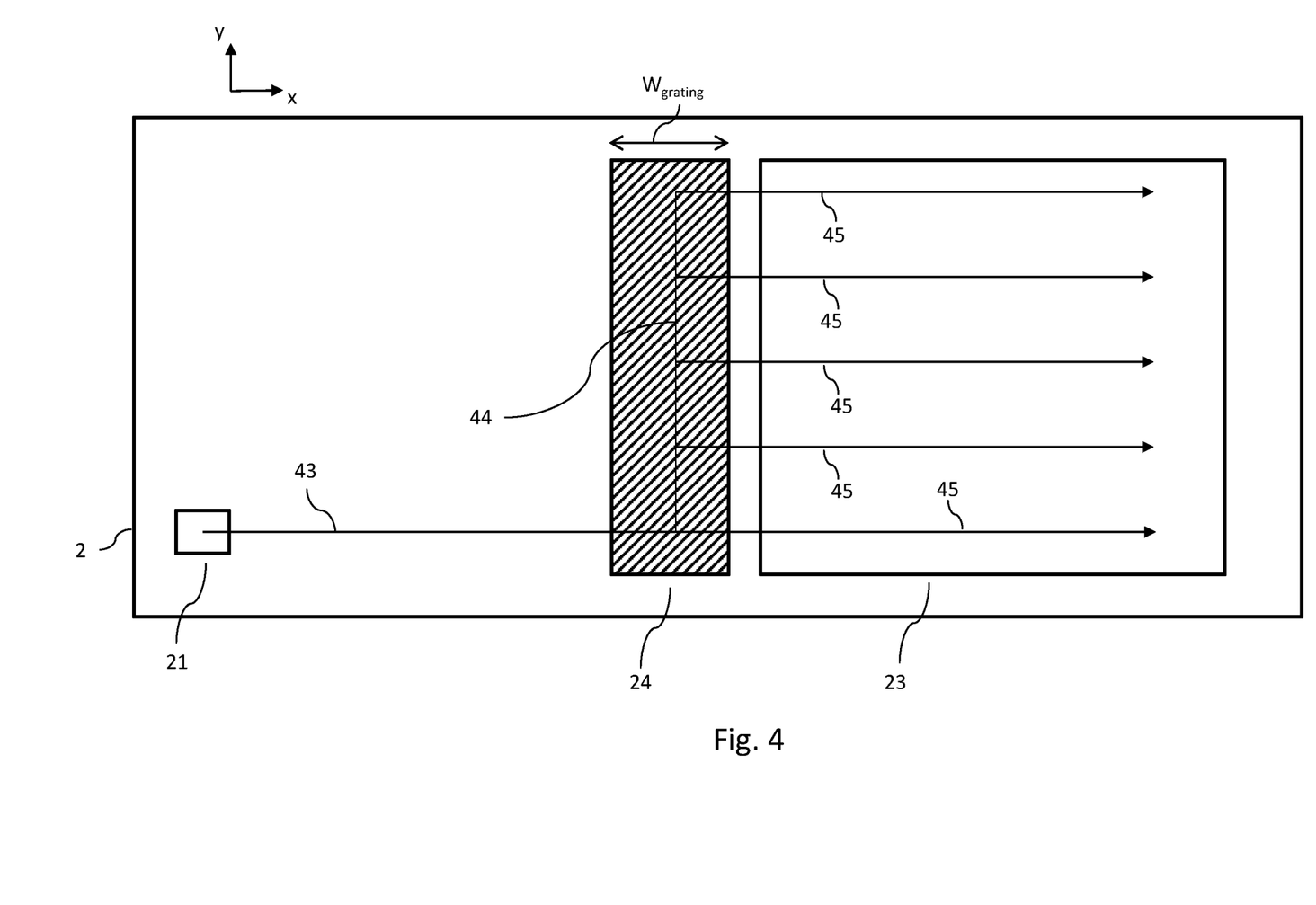
FIG. 4 is a schematic top view of an optical device according to the invention.

FIG. 4 schematically illustrates the optical device 2 according to an embodiment, in a top view showing an x-y plane perpendicular to the previously illustrated x-z plane.

As illustrated in FIG. 4, the optical device 2 comprises an intermediate diffractive optical element 24, which has a width $w_{grating}$ in the x-axis direction. Light 43 propagating from the input optical element 21 towards the output optical element 23 interacts with the intermediate diffractive optical element 24 as it passes through. The interaction provides an expansion of the light 43 in the y-direction perpendicular to the x-direction of the above-described reflective expansion, and the expanded light 45 is coupled towards the output optical element 23 to be coupled out of the waveguide towards the viewer.

Figure 5:
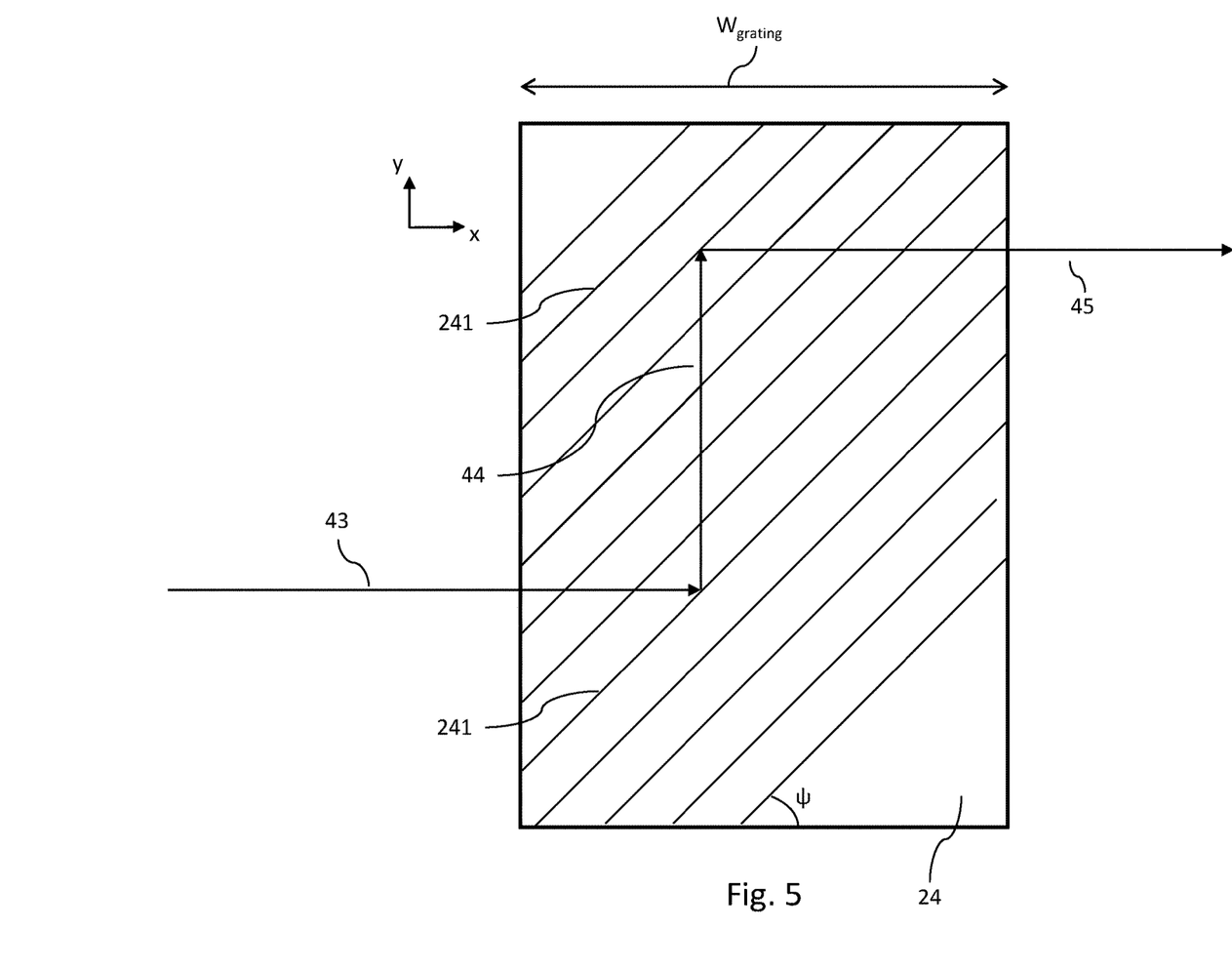
FIG. 5 is a schematic illustration of an intermediate diffractive optical element.

This interaction is illustrated in more detail in FIG. 5, which schematically illustrates the intermediate diffractive optical element 24.

As shown in FIG. 5, in this embodiment, the intermediate diffractive optical element 24 is a linear grating with a periodic pattern of parallel lines 241. The lines 241 are oriented at an angle $\Psi$ (in this case +45°) to the x-axis, which is the direction in which light is received from the input optical element 21. When light 43 encounters the intermediate diffractive optical element 24 it undergoes a first diffraction into a first order and is turned through 90°. The diffracted light 44 propagates in the y-direction, captured within the waveguide 22 by total internal reflection. The diffracted light 44 interacts with the intermediate diffractive optical element 24 again, at multiple points along its length, and at each point of interaction light is either diffracted or not diffracted. Where the light is diffracted, a second diffraction with the intermediate diffractive optical element 24 turns the light once more through 90° so that the light 45 is coupled towards the output optical element 23 in a direction that is parallel with the x-axis. The undiffracted light continues to propagate within the waveguide 22 for interaction with the intermediate diffractive optical element 24 at a further point. In this way, the intermediate diffractive optical element 24 provides a one-dimensional expansion of the light in the y-axis. Light 45 that propagates from the intermediate diffractive optical element 24 towards the output optical element 23 has been diffracted twice within the intermediate diffractive optical element 24, and turned twice through 90°. The two diffractive interactions within the intermediate diffractive optical element 24 are equal and opposite so that they are self-conjugating and optical effects introduced by the first diffraction are counter-acted by the second diffraction.

The above-described diffraction-based expansion in the y-direction is probabilistic, and the more time (longer path length) which light spends in the intermediate diffractive optical element 24, the more it can be expected to expand. Accordingly, the expansion factor in the y-direction for light which passes through the optical device can be controlled by varying the width $w_{grating}$ of the intermediate diffractive optical element 24 in the x-axis direction.

Additionally, the expansion factor in the y-direction can be controlled by varying the angle $\Psi$. More specifically, the angle $\Psi$ dictates the direction of first order diffraction in the grating. If $\Psi$ is small, then the direction of the diffracted light 44 is similar to the direction of the received light 43, and the light spends less time in the intermediate diffractive optical element 24 and expands less. On the other hand, if $\Psi$ is larger than 45° to the x-axis, the diffracted light 44 travels backwards relative to the x-axis, and spends more time in the intermediate diffractive optical element 24 and expands more. In preferred embodiments, the angle Ψ is close to 45°, and deviates from Ψ by between 0° and ±10°.

The spacing between lines 241 may be chosen to maximise the chance of first order diffraction. This chance depends on the wavelength of the light, and so the expansion factor in the y-direction is partly wavelength dependent. For visible light applications, the spacing may be chosen to match the wavelength of green light in the waveguide.

Returning to FIG. 4, it can be seen that expansion in the y-direction only occurs in the positive y-direction when Ψ is positive. Accordingly, in this example, a centre of the output optical element 23 is displaced in the positive y-direction relative to a centre of the input optical element 21. This has the disadvantage that, because first order diffraction in a grating is less probable than transmission (zero order diffraction), a brightest part of the output light 42 is off-centre in the y-direction.

Figure 6:
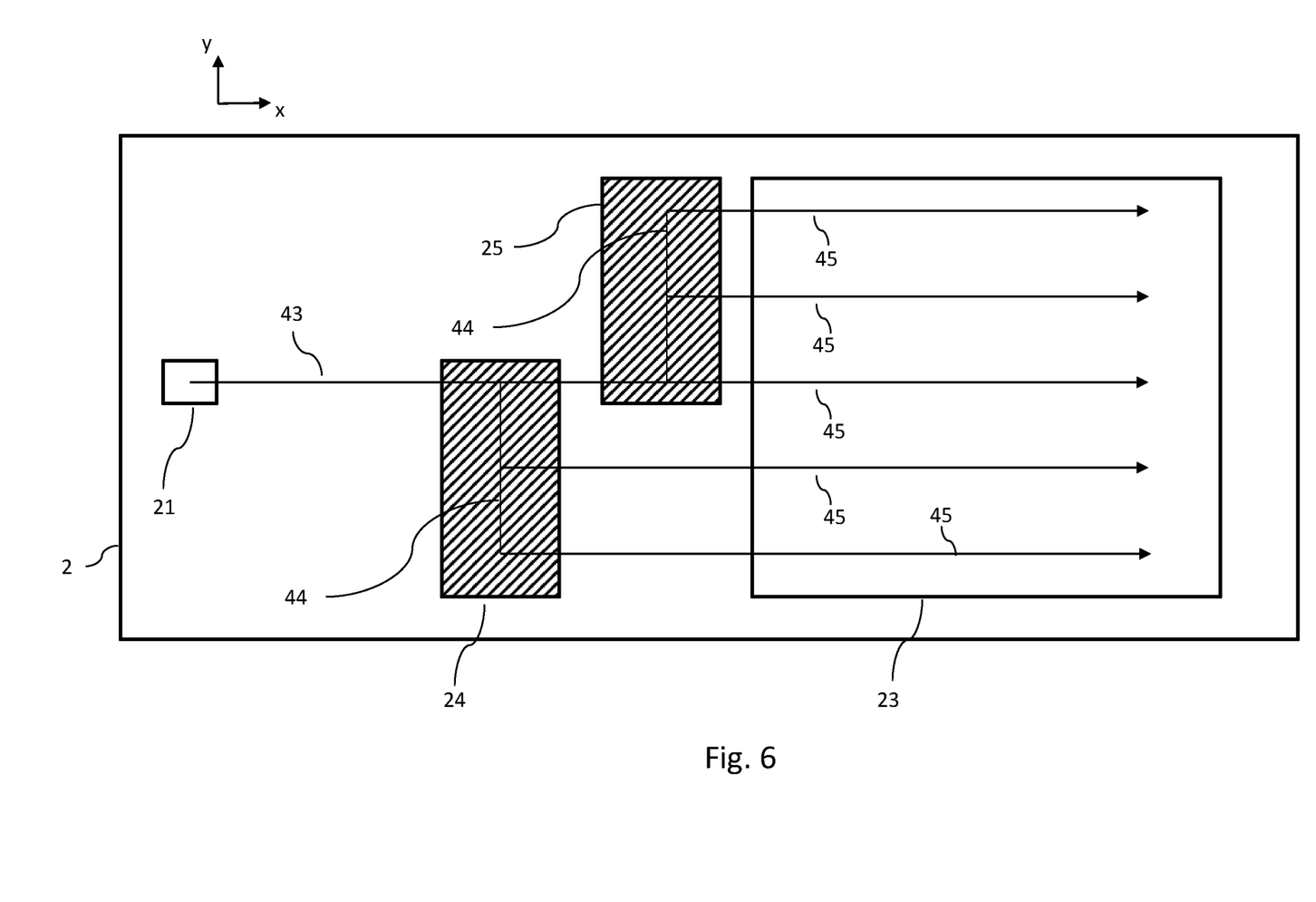
FIG. 6 is a schematic top view of an alternative optical device according to the invention.

FIG. 6 is a schematic top view of an alternative optical device 2 in which the centres of the input and output optical elements 21, 23 are aligned in the y-direction, and the expanded light output from the optical device 2 can be symmetrically bright in the y-axis.

In FIG. 6, the diffractive optical element comprises a first grating 24 and a second grating 25. Each of the first grating 24 and the second grating 25 may be similar to the grating described above with reference to FIG. 5. However, for one grating the angle Ψ is positive and for the other grating the angle Ψ is negative, such that the gratings provide expansion in opposite directions along the y-axis. The first grating and second grating preferably provide equal expansion factors.

Figure 7:
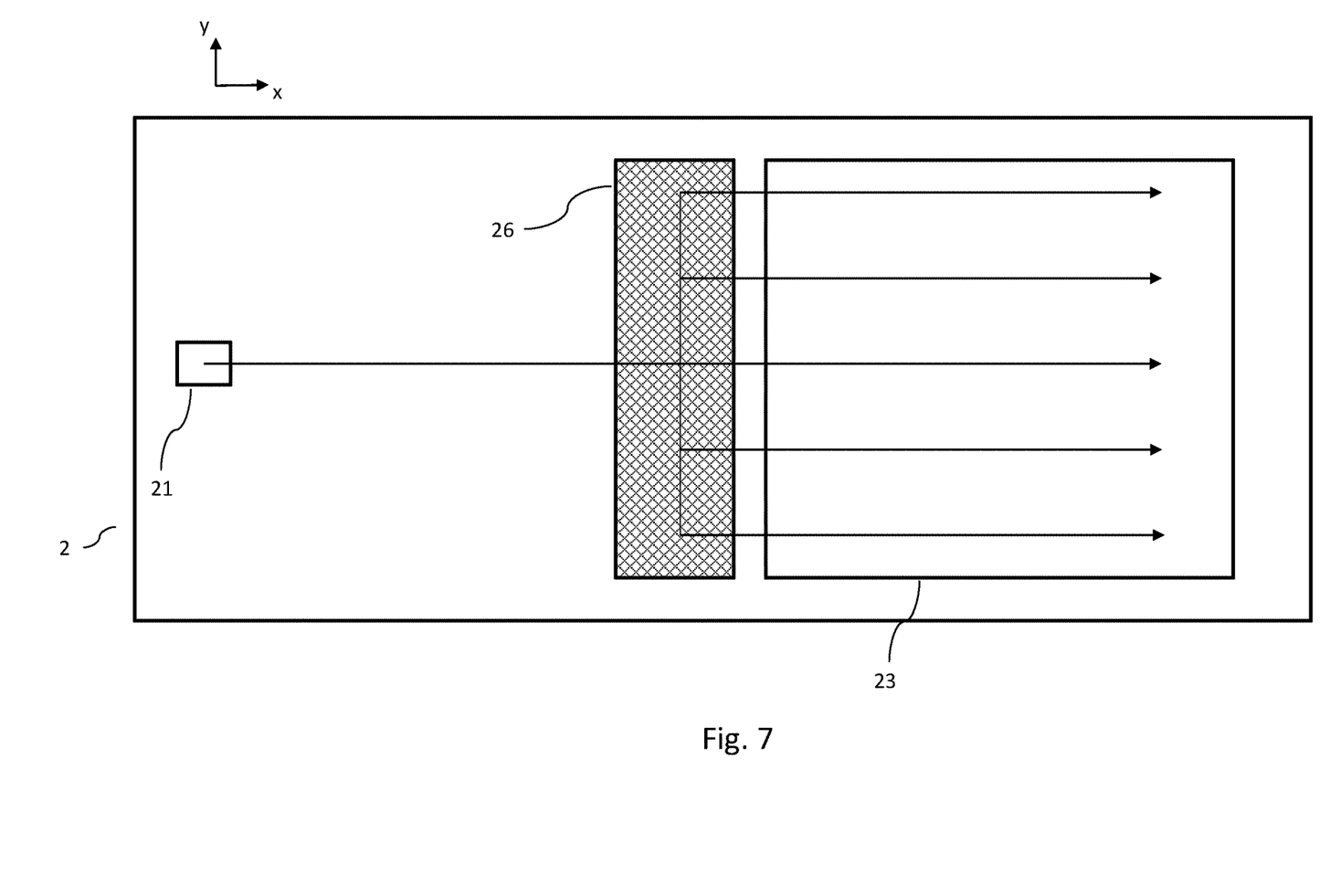
FIG. 7 is a schematic top view of a further alternative optical device according to the invention.

FIG. 7 is a schematic top view of a further alternative optical device 2 in which the centres of the input and output optical elements 21, 23 are aligned in the y-direction, and the expanded light output from the optical device 2 can be symmetrically bright in the y-axis.

In FIG. 7, the diffractive optical element comprises a pair of crossed gratings 26 in the x-y plane. The crossed gratings 26 may be substantially similar to the first and second gratings 24, 25 of FIG. 6, where the gratings are provided on two opposing surfaces of the waveguide 22, wherein the opposing surfaces oppose each other in the z-direction. Alternatively, the crossed gratings 26 may be a single structure on one surface of the waveguide 22, or may be a single structure that extends across the waveguide 22 in the z-direction. For example, the crossed gratings 26 may take the form of a photonic crystal with a triangular lattice, as described in WO 2016/020643 A1.

Figure 8:
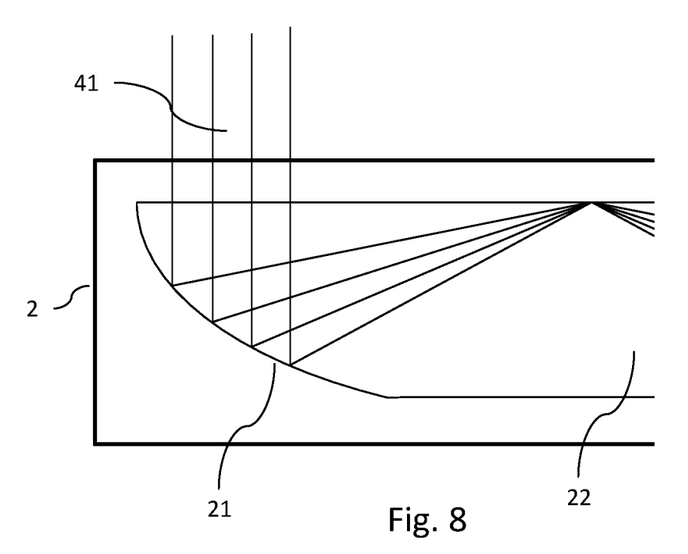
FIG. 8 is a schematic illustration of a further alternative optical device according to the invention.

In the above described embodiments, expansion of light in the x-direction by total internal reflections requires that the input light is distributed over an angular field of view. However, in another embodiment, parallel light in a planar field of view may be expanded in the x-axis. More specifically, the input reflective surface and output reflective surface may be respective curved surfaces (e.g. parabolic surfaces), or a series of flat surfaces arranged to approximate a curved surface, such that the light has an angular distribution of directions while passing through the waveguide, but is parallel when entering the optical device at the input optical element and when exiting the optical device at the output optical element. A relative focal length of the curved surfaces may be configured according to the desired expansion factor in the x-direction. FIG. 8 schematically illustrates part of an optical device according to the invention, having an input optical element designed to receive parallel light. In embodiments where the reflective surfaces are curved, the output reflective surface may be oriented as a reflection of the input reflective surface in the y-z plane, when the projector and user are to be arranged as shown in FIG. 2A, and the output reflective surface may be oriented as a rotation of the input reflective surface in the x-z plane, when the projector and user are to be arranged as shown in FIG. 2B.

By independently controlling the expansion factor in the y-direction and the expansion factor in the x-direction using the above-described independent reflective and diffractive mechanisms, the optical device 2 can be configured to provide a predetermined rectangular expansion where the aspect ratio of the output light may be different from the input light. This means that the design of a projector 1 need not be constrained by a desired aspect ratio for light 42 that is projected towards the user's eye 3.

In the above-described examples, the input optical element reflects light towards the output optical element, and the light passes through the intermediate diffractive optical element before reaching the output optical element. However, in other examples, the optical elements need not be arranged in a line. For example, the optical device may comprise one or more internal reflective elements configured to redirect light within the x-y plane of the waveguide. Such internal reflective elements may be used to provide one or more corners in an optical path taken by light within the waveguide. In such examples, the above-described expansion in the x-direction is generalised to expansion parallel to the direction of motion of light in the waveguide, and the above-described expansion in the y-direction is generalised to expansion perpendicular to the direction of motion of light incident on the intermediate diffractive optical element.

In some embodiments, a plurality of optical devices as described above may be stacked. Each optical device may be configured to optimally expand a different light frequency. Light may be passed through multiple stacked optical devices by using beam splitters as the input optical element 21 and output optical element 23.

The invention claimed is:

1. An optical device for expanding input light and outputting the expanded light, the optical device comprising:
   a waveguide;
   an input optical element configured to receive light incident on a first side of the waveguide and comprising a curved, smooth, continuous input reflective surface configured to reflect the received light into the waveguide;
   an intermediate diffractive optical element configured to receive light in the waveguide from a first direction, and provide an expansion of the received light in a second direction perpendicular to the first direction; and
   an output optical element comprising a curved, smooth, continuous output reflective surface configured to reflect the expanded light out of the waveguide towards a viewer,
   wherein the waveguide is configured to guide light along an optical path from the input optical element to the intermediate diffractive optical element and from the intermediate diffractive optical element to the output optical element.

2. An optical device according to claim 1, wherein the output optical element is configured to reflect light out of the waveguide through the first side.

3. An optical device according to claim 1, wherein the input optical element is configured to reflect light into the waveguide with a range of angles relative to a plane of the waveguide, such that the received light is expanded by a first expansion factor parallel to its direction of motion within the waveguide.

4. An optical device according to claim 3, wherein the intermediate diffractive optical element is configured to expand the received light in the second direction by second expansion factor that is a predetermined multiple of the first expansion factor.

5. An optical device according to claim 1, wherein the intermediate diffractive optical element comprises a first grating oriented at a third angle to light received from the input optical element to provide a first diffraction and a second diffraction within the intermediate diffractive optical element in order to couple light towards the output optical element, wherein the first diffraction couples light from the input optical element towards the first grating at a fourth angle so that the second diffraction is provided at a plurality of spaced positions in the intermediate diffractive optical element thereby providing expansion of light, wherein the second diffraction couples light towards the output optical element.

6. An optical device according to claim 5, wherein the intermediate diffractive optical element further comprises a second grating oriented at a fifth angle to light received from the input optical element to provide a third diffraction and a fourth diffraction within the intermediate diffractive optical element in order to couple light towards the output optical element, wherein the third diffraction couples light from the input optical element towards the second grating at a fourth angle so that the fourth diffraction is provided at a plurality of spaced positions in the intermediate diffractive optical element thereby providing one-dimensional expansion of light, wherein the fourth diffraction couples light towards the output optical element.

7. An optical device according to claim 6, wherein the first angle and the third angle are substantially equal and opposite.

8. An optical device according to claim 7, wherein the first angle is $+(45+\Delta)°$ and the third angle is $-(45+\Delta)°$, where $\Delta$ is non-zero.

9. An optical device according to claim 6, wherein the first and second gratings are physically spaced apart on the waveguide.

10. An optical device according to claim 6, wherein the first and second gratings are at least partially overlaid on one another in the waveguide as a pair of crossed gratings.

11. An optical device according to claim 10, wherein the first and second gratings are provided on opposing surfaces of the waveguide.

12. An optical device according to claim 10, wherein the first and second gratings are provided in substantially a same plane in the waveguide.

13. An optical device according to claim 10, wherein the first and second gratings are provided using a photonic crystal.

14. An optical system comprising:
a projector arranged to project light; and
an optical device for expanding input light and outputting the expanded light, the optical device comprising:
a waveguide;
an input optical element configured to receive light from the projector incident on a first side of the waveguide, and including a curved, smooth, continuous input reflective surface configured to reflect the received light into the waveguide;
an intermediate diffractive optical element configured to receive light in the waveguide from a first direction, and provide an expansion of the received light in a second direction perpendicular to the first direction; and
an output optical element including a curved, smooth, continuous output reflective surface configured to reflect the expanded light out of the waveguide towards a viewer,
the waveguide configured to guide light along an optical path from the input optical element to the intermediate diffractive optical element and from the intermediate diffractive optical element to the output optical element.

15. An optical system according to claim 14, wherein the projector is configured to project light across an angular field of view of the input optical element.

16. A method, comprising:
projecting light towards a first side of a waveguide;
reflecting received light from the projector incident on the first side into the waveguide through an input optical element comprising a curved, smooth, continuous input reflective surface;
receiving light in the waveguide from a first direction at an intermediate diffractive optical element;
expanding the received light in a second direction perpendicular to the first direction through the intermediate diffractive optical element;
reflecting expanded light from the intermediate diffractive optical element out of the waveguide towards a viewer through an output optical element comprising a curved, smooth, continuous output reflective surface; and
guiding light along an optical path from the input optical element to the intermediate diffractive optical element and from the intermediate diffractive optical element to the output optical element through the waveguide.

17. The method of claim 16, wherein projecting light comprises projecting light across an angular field of view of the input optical element.

18. The method of claim 16, wherein reflecting expanded light from the intermediate diffractive optical element out of the waveguide towards a viewer through the output optical element comprises reflecting the expanded light from an output reflective surface of the output optical element.

19. The method of claim 16, wherein the reflecting expanded light from the intermediate diffractive optical element out of the waveguide towards a viewer through the output optical element comprises reflecting light out of the waveguide through the first side.

20. The method of claim 16, wherein expanding the received light in the second direction perpendicular to the first direction through the intermediate diffractive optical element comprising expanding the received light in the second direction by second expansion factor that is a predetermined multiple of a first expansion factor associated with expansion parallel to a direction of motion of the received light within the waveguide.

* * * * *